US011360464B2

(12) United States Patent
Wu et al.

(10) Patent No.: US 11,360,464 B2
(45) Date of Patent: Jun. 14, 2022

(54) HIGH INTENSITY MULTI DIRECTION FDM 3D PRINTING METHOD FOR STEREO VISION MONITORING

(71) Applicants: BEIJING UNIVERSITY OF TECHNOLOGY, Beijing (CN); BEIJING YUNSHEN TECHNOLOGY CO. LTD., Beijing (CN)

(72) Inventors: Lifang Wu, Beijing (CN); Yupeng Guan, Beijing (CN); Miao Yu, Beijing (CN); Yisong Gao, Beijing (CN); Meishan Liu, Beijing (CN); Zechao Liu, Beijing (CN); Meng Jian, Beijing (CN); Ye Xiang, Beijing (CN); Ge Shi, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 0 days.

(21) Appl. No.: 17/306,880

(22) Filed: May 3, 2021

(65) Prior Publication Data

US 2021/0302949 A1 Sep. 30, 2021

Related U.S. Application Data

(63) Continuation of application No. PCT/CN2019/073106, filed on Jan. 25, 2019.

(30) Foreign Application Priority Data

Nov. 5, 2018 (CN) .......................... 201811305782.4

(51) Int. Cl.
*G05B 19/418* (2006.01)
*B33Y 10/00* (2015.01)
(Continued)

(52) U.S. Cl.
CPC ...... *G05B 19/41875* (2013.01); *B29C 64/118* (2017.08); *B29C 64/268* (2017.08);
(Continued)

(58) Field of Classification Search
CPC .......... G05B 19/41875; G05B 19/4099; G05B 2219/32177; G05B 2219/35134;
(Continued)

(56) References Cited

U.S. PATENT DOCUMENTS

2003/0027363 A1* 2/2003 Kodama ............ G05B 23/0289
438/14
2008/0118103 A1* 5/2008 Pescatore ................ A61B 34/20
382/103
(Continued)

FOREIGN PATENT DOCUMENTS

CN 105291442 A * 2/2016 .......... B29C 64/118
CN 105291442 A 2/2016
(Continued)

OTHER PUBLICATIONS

International Search Report of PCT/CN2019/073106.
Search Report of CN201811305782.4.
Written Opinion of PCT/CN2019/073106.

*Primary Examiner* — Thomas C Lee
*Assistant Examiner* — Michael Tang
(74) *Attorney, Agent, or Firm* — J.C. Patents

(57) ABSTRACT

High intensity multi-directional FDM 3D printing method for stereo vision monitoring involves intelligent control and computer vision technology. Specifically, it involves multi-directional 3D printing hardware platform construction, stereo vision detection, laser heating to enhance the connection strength between various parts of the model, so as to reduce the use of external support structure as much as possible on the premise of ensuring the printing accuracy,
(Continued)

and make the various parts of the model can be well connected to enhance the integrity of the model.

7 Claims, 5 Drawing Sheets

(51) Int. Cl.
  *B33Y 30/00* (2015.01)
  *B33Y 50/02* (2015.01)
  *B29C 64/118* (2017.01)
  *B29C 64/393* (2017.01)
  *B29C 64/268* (2017.01)
  *G05B 19/4099* (2006.01)
  *H04N 13/204* (2018.01)
  *B29K 55/02* (2006.01)
  *B29K 67/00* (2006.01)

(52) U.S. Cl.
  CPC ............ *B29C 64/393* (2017.08); *B33Y 10/00* (2014.12); *B33Y 30/00* (2014.12); *B33Y 50/02* (2014.12); *G05B 19/4099* (2013.01); *B29K 2055/02* (2013.01); *B29K 2067/046* (2013.01); *G05B 2219/32177* (2013.01); *G05B 2219/35134* (2013.01); *G05B 2219/37558* (2013.01); *G05B 2219/49023* (2013.01); *H04N 13/204* (2018.05)

(58) Field of Classification Search
  CPC ........... G05B 2219/37558; G05B 2219/49023; B33Y 10/00; B33Y 30/00; B33Y 50/02; B33Y 50/00; B29C 64/118; B29C 64/393; B29C 64/268; B29C 64/386; H04N 13/204; B29K 2055/02; B29K 2067/046
  See application file for complete search history.

(56) References Cited

U.S. PATENT DOCUMENTS

| | | | | |
|---|---|---|---|---|
| 2012/0126115 | A1* | 5/2012 | Heise | G02B 21/34 |
| | | | | 250/307 |
| 2014/0129021 | A1* | 5/2014 | Boynton | G06F 30/20 |
| | | | | 700/118 |
| 2014/0291886 | A1* | 10/2014 | Mark | B29C 69/001 |
| | | | | 264/163 |
| 2015/0120639 | A1* | 4/2015 | Shin | G06K 9/6221 |
| | | | | 706/52 |
| 2016/0310217 | A1 | 10/2016 | Park | |
| 2016/0311165 | A1* | 10/2016 | Mark | B29C 64/393 |
| 2017/0072633 | A1* | 3/2017 | Hsu | B29C 64/106 |
| 2018/0361729 | A1* | 12/2018 | Gibson | G01S 17/42 |
| 2019/0311488 | A1* | 10/2019 | Sareen | G06T 13/40 |
| 2020/0329814 | A1* | 10/2020 | Wang | B29C 64/245 |
| 2021/0147193 | A1* | 5/2021 | Kosaka | G01B 11/026 |
| 2021/0272359 | A1* | 9/2021 | Michielin | G06T 17/20 |

FOREIGN PATENT DOCUMENTS

| | | |
|---|---|---|
| CN | 106346776 | 1/2017 |
| CN | 107263858 | 10/2017 |
| CN | 108527848 | 9/2018 |
| JP | H0870281 A | 3/1996 |
| WO | WG2017140281 | 8/2017 |
| WO | WO2018112770 A1 | 6/2018 |

\* cited by examiner

HIGH INTENSITY MULTI DIRECTION FDM 3D PRINTING METHOD FOR STEREO VISION MONITORING

CROSS-REFERENCE TO RELATED APPLICATIONS

This application is a continuation of International Application No. PCT/CN2019/073106, filed on Jan. 25, 2019, which claims priority to Chinese Patent Application No. 201811305782.4, filed on Nov. 5, 2018, both of which are hereby incorporated by reference in their entireties.

TECHNICAL FIELD

The present application relates to related technologies of intelligent control and computer vision, and studies a high-intensity multi-directional FDM 3D printer and a printing method for stereo vision monitoring. It specifically involves the construction of multi-directional FDM 3D printing hardware platform, stereo vision detection, laser heating to enhance the connection strength between the various parts of the model, so as to reduce the use of external support structure as much as possible on the premise of ensuring the printing accuracy, and make the various parts of the model can be well connected to enhance the integrity of the model.

BACKGROUND TECHNOLOGY

In recent years, 3D printing has developed rapidly, but due to the high material cost and low printing accuracy, 3D printing is limited in practical application.

Traditional FDM 3D printers can only print along a single direction. In order to solve this problem, many experts are devoted to the research of multi-directional FDM 3D printers. However, most multi-directional FDM 3D printers adopt the method of segmentation first and then printing. The printing method divides the model into several parts and prints them separately, because the latter part prints after the former part, In addition, the printing direction of the latter part is inconsistent with that of the former part, and the model printed first and supporting the part to be printed has cooled when printing the current part to be printed, and there are seams at the joint of the two parts, which destroy the integrity of the model. Therefore, it is of great significance to study high-intensity multi-directional FDM 3D printing for stereo vision monitoring.

INVENTION CONTENT

The embodiment of the invention will provide a set of high-intensity multi-directional FDM 3D printer design and printing method for stereo vision monitoring. The stereo vision system is used to locate the printing position, and the $CO_2$ laser is used to heat the connection between various parts, so as to enhance the interlayer strength and ensure the integrity of the model. The specific process includes the following steps:

1. A high-intensity multi-directional FDM 3D printing method for stereo vision monitoring, which is characterized by the following steps:

100—Multi direction printing model is divided into several parts, each part has different printing direction, and the latter part is supported by the first part and the printing platform. After each part is printed, the printed part needs to be rotated to change the printing direction;

The connection between the printed part and the part to be printed is called the section;

200—Stereo vision monitoring

The 3D scanner is used to scan the section on the printed part of the model and at the junction with the part to be printed. The error between the section center position obtained by scanning and the section center position of the model is calculated, and the detected error is corrected in real time to make it meet the printing accuracy requirements;

300—The front n layer of the part to be printed is heated by $CO_2$ laser; The laser head is fixed on one side of the print head. If there are two laser heads, they are respectively fixed on the left and right sides. The laser head moves with the print head. The diameter of the spot produced by the laser head is R. the print extrusion head is just at the center of the laser spot.

The laser heating temperature is the glass transition temperature of the print material, so that the connection with the part to be printed is in the glass state, so as to enhance the connection strength between the layers, the value of N need to make the connection surface between the parts bear a tensile force greater than 1400N.

The laser heating temperature is the glass transition temperature (TG) of the printing material. The purpose is to make the joint with the part to be printed in the glass state (the molecular chain and the chain segment can not move, but the atoms or groups that constitute the molecule vibrate in their equilibrium position), so as to enhance the strength of the connection between layers and make the joints between each part not obvious or even disappear.

In addition to the multi axis printing system, the mechanical equipment also works with stereo vision system and $CO_2$ laser heating system.

In step 100, printing is a long process. Each time a part is printed, the printed part is rotated to make the printing direction suitable for the part to be printed, that is, the printed model part can fully support the part to be printed. In this invention patent, the connection between the printed part and the part to be printed is called the section or the connection surface.

Steps 200 and 300 are methods for improving the quality of a print product.

In step 200, the position of the 3D scanner should be fixed before printing, so that the printing platform is located in the center of the scanner's field of view, so as to ensure that the conversion relationship between the scanner coordinate system and the world coordinate system is fixed.

At the end of each rotation, the 3D scanner will scan the coordinate information of all points within its field of vision. This patent proposes two solutions. The first one is to directly use Geomagic quality software for manual screening, which is fast but needs manual intervention; The second method is to filter according to the height information of the ideal position, and then cluster the selected points to get the point cloud data on the section. Although this method has a large amount of calculation, it can be fully automatic.

Step 300 includes heating only the section portion. When printing the first part, it is supported by the printing platform. When printing other parts, it is supported by the printed part. At this time, there will be sections of the printed part and the part to be printed. The front n layers of the part to be printed will be heated, and the interlaminar strength of the section will be enhanced by preheating before melting, so as to enhance the integrity of the model.

In step 300, $CO_2$ laser should be selected for heating, because $CO_2$ laser has better directivity, monochromaticity and better frequency stability, and the output power of $CO_2$ laser is high, which can meet the requirements of heating to above 400° C. In the actual operation process, the temperature can be selected.

The material used in FDM printer is usually PLA or ABS. In this patent, the heating temperature of laser is set to the glass transition temperature of printing material. When the polymer is in glass state, it is rigid and has little deformation under the action of external force. Molecular diffusion is used to enhance the strength of interlayer connection. The glass transition temperature of PLA is 55-60° C., and that of ABS is 90-100° C.

The multi-directional high-intensity 3D printer and printing method based on stereo vision in the embodiment of the invention have the following advantages:

1) The scanning accuracy is 0.05 mm, which is much better than that of FDM 3D printing.

2) Ensure the integrity of the model. The laser heating of multi-directional 3D printing is proposed to enhance the connection strength between various parts of the model and ensure the integrity of the model.

3) The multi-directional 3D printing itself has the advantage of saving the support structure, and the invention enlarges this advantage to carry out multi-directional printing under the condition of ensuring the printing accuracy and the integrity of the model.

SPECIFIC IMPLEMENTATION MODE

The embodiments of the present application will be described in detail in combination with the accompanying drawings. It should be noted that the multi-directional 3D printing, stereo vision detection and laser heating enhanced interlaminar intensity of the present application are applicable to all 3D models without conflict.

Figure 1:
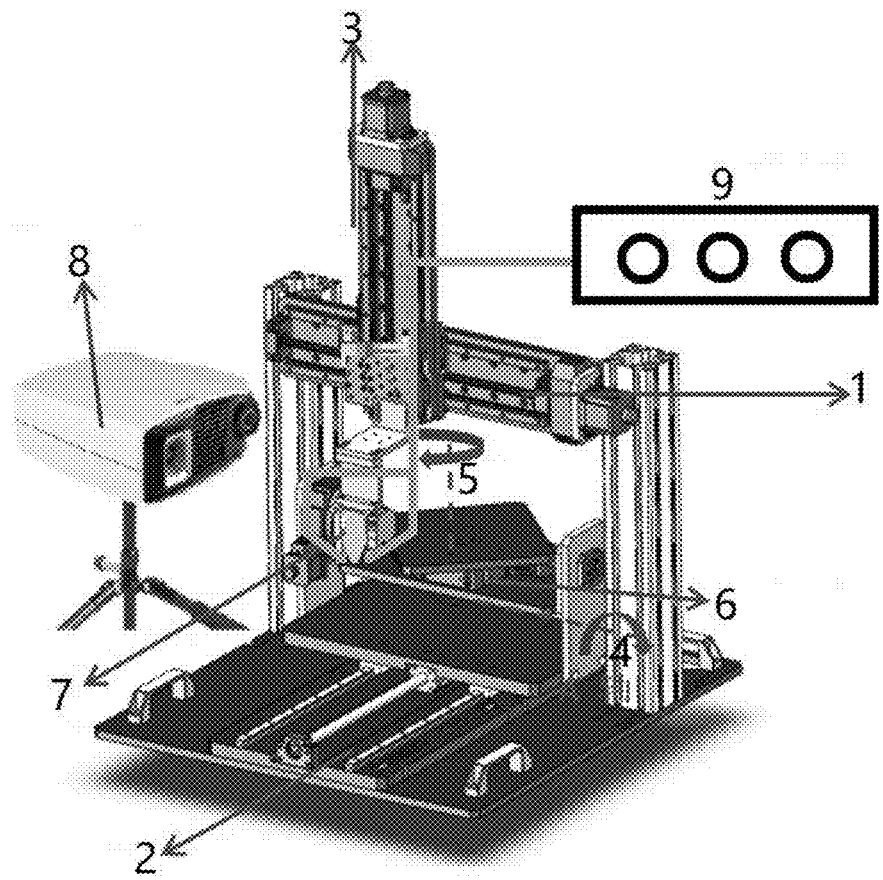
FIG. 1 high intensity multi direction FDM 3D printer for stereo vision monitoring FIG. 2 flow chart of high intensity multi direction FDM 3D printing based on stereo vision monitoring FIG. 3 flow chart of rotation result detection and correction based on vision FIG. 4 Schematic diagram of the location of mark points FIG. 5 Schematic diagram of double laser heating FIG. 6 schematic diagram of single laser heating

FIG. 1 shows a high-intensity multi-directional FDM 3D printer for stereo vision monitoring. Its structure includes five axis mechanism: 1. X axis, 2. Y axis, 3. Z axis, 4. A axis, 5. B axis; Printing and laser heating device: 6. Printing platform, 7. Printing extrusion head with laser heating device, 9. Laser; Stereo vision detection device: 8. 3D scanner.

The five axis device is mainly used to complete the printing path, which can be linked; The printing and laser heating device is used to extrude the printing material and heat the area around the extrusion head to enhance the interlaminar strength of printing; Stereo vision monitoring device is used to detect the levelness of each section. If the section does not rotate to the horizontal position, real-time feedback correction is given.

The application proposes a set of high-intensity multi-directional FDM 3D printer and printing method for stereo vision monitoring, specifically including the following steps:

Step 100. Multi direction printing

Step 200: stereo vision detection

Step 300, laser heating to enhance the interlaminar strength

It should be pointed out that there have been many research patents on multi-directional printing in step 100, which is only described as a step without detailed description.

In the step 200 of the embodiment of the invention, the depth information of all points on the section can be obtained by using the binocular 3D scanner to scan only once Alternatively, the step 100 includes the following sub steps:

Sub step 110, model segmentation. Aiming at the printability of the model, the model is divided into several parts which can be self-supporting printed.

Sub step 120, path planning. The good model will be analyzed to determine the printing order and rotation angle of the shaft.

The sub step 130 slices each part of the model separately. Decompose the motion path of the machine. Unchanged, each part is printed hierarchically according to the traditional FDM printing method. In this patent, the height of each layer is set as 0.2 mm.

Figure 2:
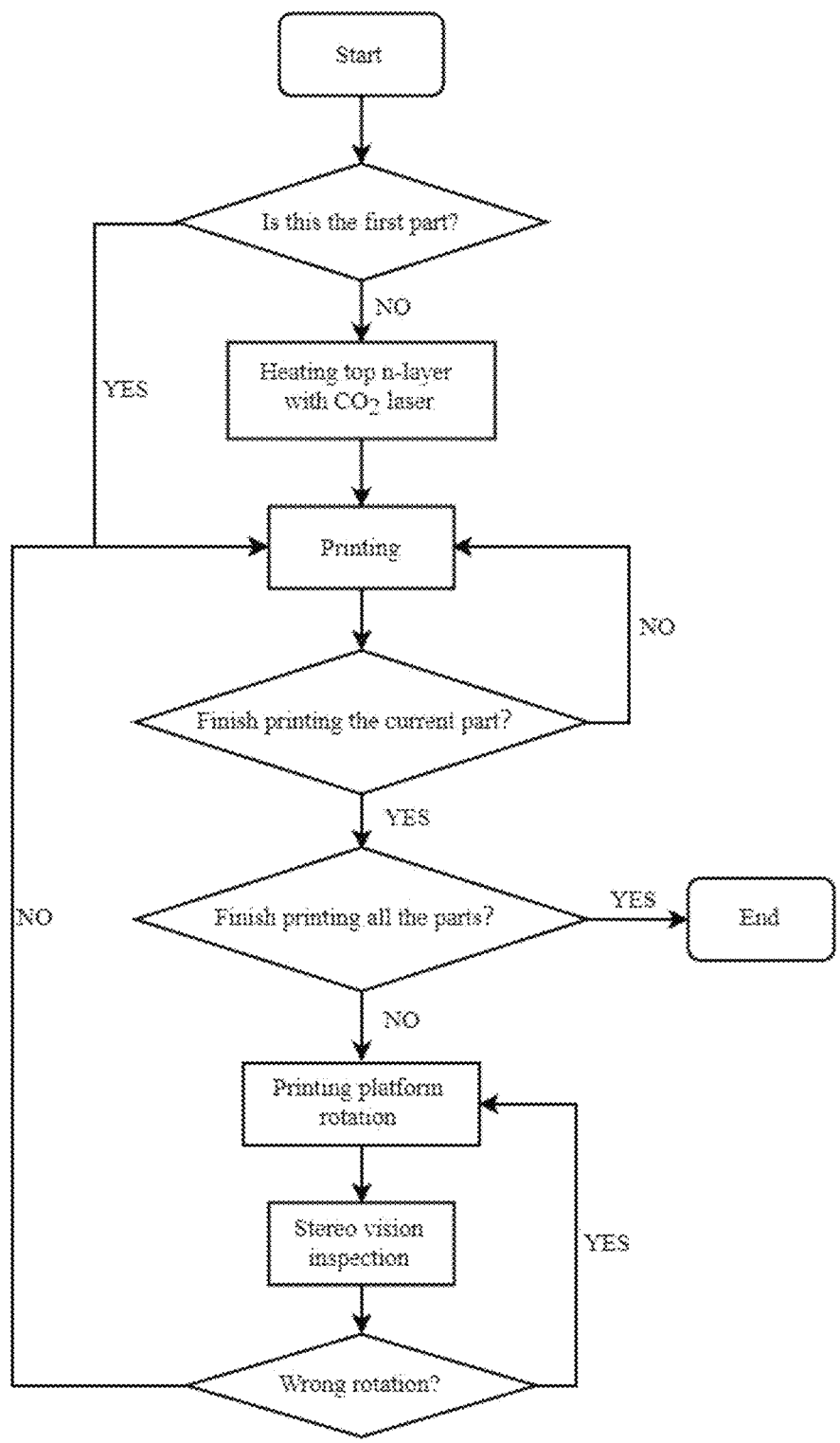

Sub step 140, printing in parts. Except for the first part, the rest parts are supported by the printed part, so when printing other parts except the first part, the laser heating operation of step 300 needs to be performed. After each printed part, the control platform rotates according to the angle calculated in sub step 120, and then performs the visual inspection operation in step 200. As shown in FIG. 2.

Further, step 200 includes the following sub steps:

Sub step 210, 3D scanner calibration. The purpose of calibration is to get the three-dimensional relationship between the coordinates of the object points in the three-dimensional world and the corresponding points in the image. The higher the calibration accuracy of the scanner, the higher the scanning accuracy of the system. In the embodiment of the invention, the accuracy of the three-dimensional scanning device is 0.05 mm. This calibration step is carried out before printing. In the printing process, the position of the 3D scanner remains unchanged, so the world coordinate fitting relationship obtained by calibration remains unchanged.

Figure 3:
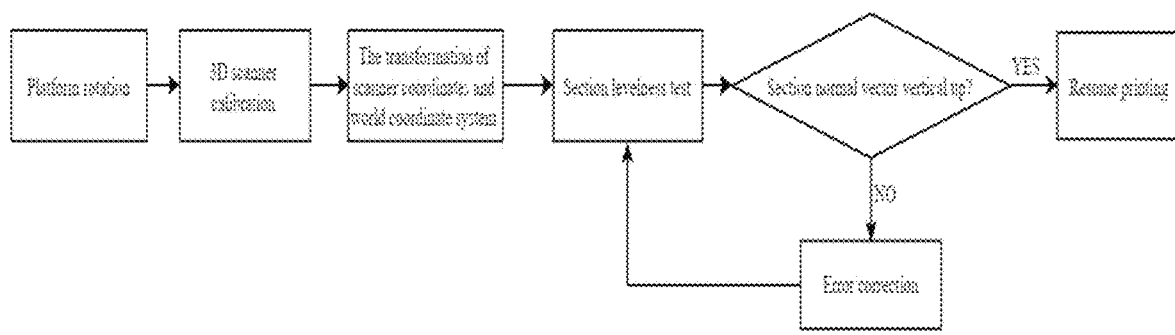
Figure 4:
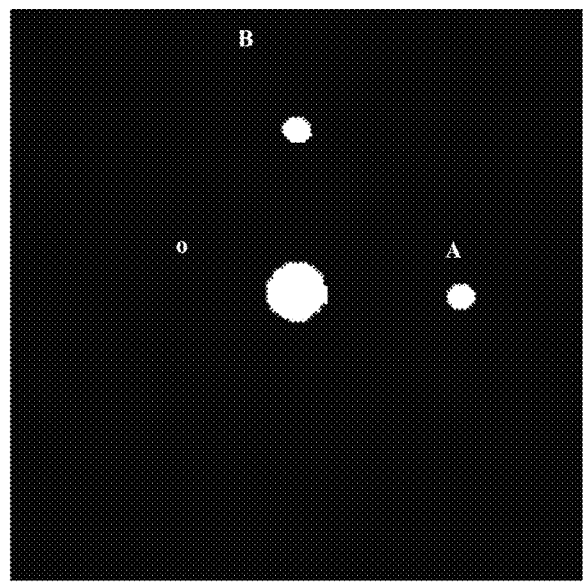

Sub step 220, transformation of scanner coordinate system and world coordinate system. According to one possible embodiment, the printing platform is adjusted to a horizontal position suitable for printing of the first module before printing starts. Paste the mark on the printing platform, as shown in FIG. 3. The plane of the printing platform is determined by points o, A and B, where point o is the position of the origin in the world coordinate system, o→A is the X direction, o→B is the Y direction. Through scanning, we can easily get the coordinate information of the three mark points in the scanner.

Sub step 230, The coordinate system is determined by sticking mark points, and the position of oxy is marked with three points;

Section levelness detection; According to the model calculation, the C coordinate of the center point after rotation is $(x_c, y_c, z_c)$. By analyzing the shape of the section, the minimum bounding rectangle of the section is obtained, and the size of the rectangle is x*y; By analyzing the point cloud data in the world coordinate system, Select all the points whose ordinate is within the height range of section deviation 10°, that is, the points whose ordinates meet the condition $z_c - \frac{1}{2} \times \max(x,y) \times \sin 10° \le z \le z_c + \frac{1}{2} \times \max(x,y) \times \sin 10°$ are recorded;

K-means clustering is applied to the selected points: the points are projected on the plane, and the points with a distance less than 0.1 mm are clustered into one group according to the distance relationship between points. The group with the most points is the point cloud data corresponding to the cross section. After the points on the cross section are selected, the scattered points are fitted into the plane, that is, the plane where the cross section is located, and the normal vector of the cross section is obtained, If the angle between the section normal vector and the vertical vector is greater than 0.5°, error correction is performed, otherwise continue to print.

It should be pointed out that in the embodiment of the invention, the k-means algorithm is used to cluster the points whose distance is less than 0.1 mm into one category. Therefore, all the connected areas whose distance is less than 0.1 mm can be selected, and the number of classification is m. by comparing the number of midpoint of each category, the category with the most points is selected as the point on the section.

Sub step 240, error correction. The B-axis of the five axis mechanical system is fixed above the A-axis, so when the A-axis rotates, the position of the B-axis will also change. When calculating the correction angle by visual inspection, the current position of the rotation axis is calculated according to the relationship between the section normal vector and the rotation axis, and the space rectangular coordinate system is established with the rotation axis as the coordinate axis, Then the coordinates of the normal vector and the vertical vector in the new coordinate system are obtained, and the rotation angle is decomposed into the new coordinate axis to calculate the correction angle.

Figure 5:
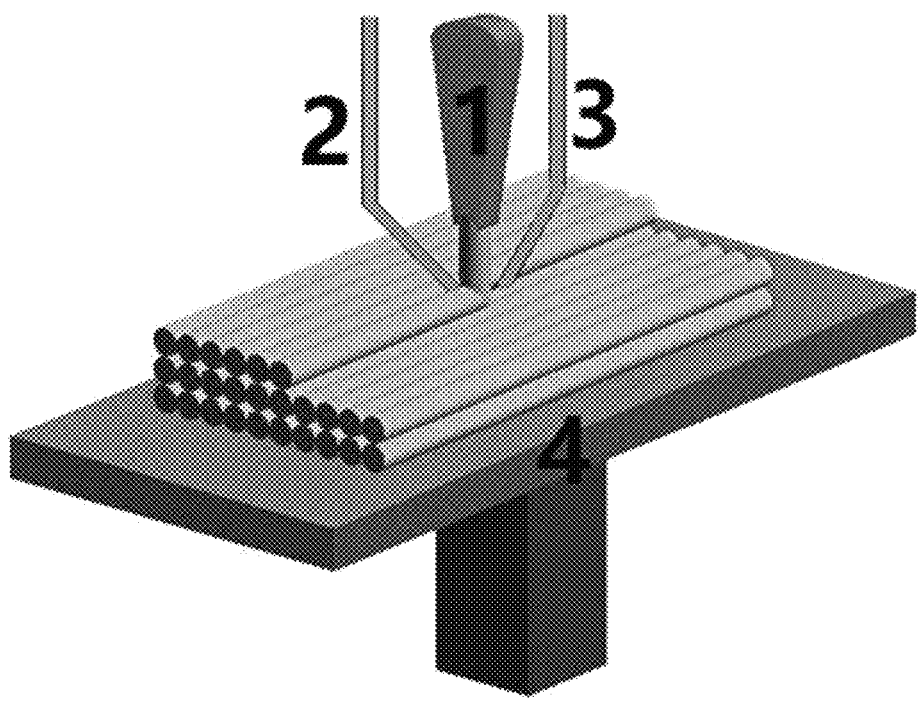

The step 300 includes:

According to a feasible implementation mode, referring to FIG. 5, the first five layers of other parts except the first part are heated. In this patent, the thickness of each layer is set to be 0.2 mm, in which the heating temperature is the glass state temperature of the material. In FIG. 5, 1 is the print extrusion head, 2 and 3 are the laser paths, and 4 is the printed part of the model.

It should be pointed out that since the strength of the continuous unidirectional printing interlayer connection can withstand the tensile force of 1500N, the expected effect of enhancing the interlayer strength mentioned later is that the connection surface between the parts can withstand the tensile force of more than 1400N.

It should be pointed out that, as shown in FIG. 5, the laser heating in the present invention is carried out at the same time before and after the printing direction, so as to achieve the effect of pre preheating and post leveling. At this time, the radius (R) of the laser beam is less than 5 mm, and the heating temperature is the glass state temperature of the printing material.

It should be pointed out that if the irradiation range of the laser beam is increased, the heating area of the laser beam with the print head as the center will be increased. Because the laser power is fixed, when the heating area is increased, the average temperature will decrease.

Figure 6:
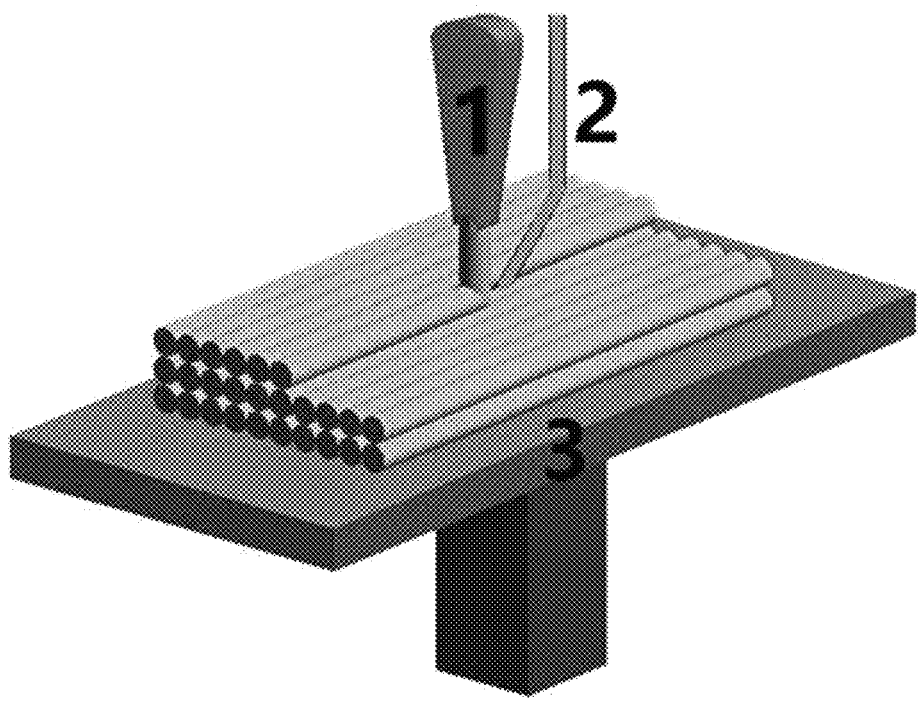

In the embodiment of the invention, if R is greater than 5 mm, only one laser head can be used for heating operation, as shown in FIG. 6, where 1 is the printing extrusion head, 2 is the laser path, and 3 is the printed part of the model. When the laser radius is greater than 5 mm and the laser beam heating temperature is the glass state temperature of the printing material, the temperature of the area around the printing head can also be increased, so as to achieve the expected effect of enhancing the interlayer connection strength.

It should be pointed out that in the present invention, n=5 is taken to ensure the effect of enhancing the connection strength between the various parts of the model, but if n takes other values and still meets the connection strength requirements, the value of N can also be adjusted.

The multi-directional high-intensity 3D printer and printing method based on stereo vision in the embodiment of the invention have the following advantages:

1) The scanning accuracy is 0.05 mm, which is much better than that of FDM 3D printing.

2) Ensure the integrity of the model. The laser heating of multi-directional 3D printing is proposed to enhance the connection strength between various parts of the model and ensure the integrity of the model.

3) The multi-directional 3D printing itself has the advantage of saving the support structure, and the invention enlarges this advantage to carry out multi-directional printing under the condition of ensuring the printing accuracy and the integrity of the model.

What is claimed is:

1. A high-intensity multi-directional fused-deposition-modeling (FDM) 3D printing method for stereo vision monitoring, comprising the following steps:

dividing a model into several parts, each part has a different printing direction, and a latter printed part is supported by a previously printed part and a printing platform;

printing the several parts in a predetermined order, wherein each part contains multiple layers and is printed layer by layer;

after each part is printed, rotating the printed part to change the printing direction;

after rotating the printed part, scanning, with a 3D scanner, a section of the printed part, on which section a next part is to be printed, based on the scanned images:

calculating an error between a section center position obtained by the scanning and a section center position of the model, and correcting the error in real time to meet printing accuracy requirements;

calculating an error between a section center position obtained by the scanning and a section center position of the model, and correcting the error in real time to meet printing accuracy requirements;

determining a world coordinate system using three sticking mark points on the printing platform for marking positions of origin, X axis, and Y axis (OXY);

calculating coordinate of the center position $(x_c, y_c, z_c)$ after rotation based on the model; analyzing a shape of the section to obtain a minimum bounding rectangle of the section, and a size of the rectangle is x*y; analyzing point cloud data in the world coordinate system to select all points whose ordinate is within a height range of section deviation 10°, the points whose ordinates meet the condition $z_c - \frac{1}{2} \times \max(x,y) \times \sin 10° \leq z \leq z_c + \frac{1}{2} \times \max(x,y) \times \sin 10°$ are recorded;

applying K-means clustering to the selected points: the selected points are projected on a plane, and points with a distance less than 0.1 mm are clustered into one group according to a distance relationship between points; the group with most points is the section point cloud data corresponding to the section; after the section point cloud data is selected, the section point cloud data is fitted into a fitted plane where the section is located, and a normal vector of the section is obtained;

performing angle error correction in response to a correction angle between the normal vector of the section and a vertical vector being greater than 0.5°, otherwise continuing to print;

wherein, when calculating the correction angle, a current position of a rotation axis is calculated according to a relationship between the normal vector of the section and the rotation axis, and a new space rectangular coordinate system is established with the rotation axis as a coordinate axis; then coordinates of the normal vector of the section and the vertical vector in the new coordinate system are calculated, and a rotation angle is decomposed into a coordinate axis of the new coordinate system to calculate the correction angle;

wherein, during printing first N layers of a part, a light spot is produced by a laser head for heating print material of the first N layers, a heating temperature is a glass transition temperature of the print material, a print extrusion head moves along a printing path and is aligned with the light spot which moves with the print extrusion head.

2. The method according to claim 1, wherein, addition to a multi axis printing system, the method also works with a stereo vision system and a CO2 laser heating system.

3. The method according to claim 1, wherein N is taken as 5, so that a connection surface between adjacent parts can bear a tensile force greater than 1400N.

4. The method according to claim 1, wherein two laser heads are used to produce two light spots, one light spot is positioned upstream of the print extrusion head, the other light spot is positioned downstream of the print extrusion head along the printing path, and the radius of the light spots is less than 5 mm.

5. The method according to claim 1, wherein the printing accuracy requirements include that: position accuracy is 0.1 mm and a correction threshold setting in the angle error correction is less than 0.5°;

wherein in response to calculated correction angle being less than 0.5°, no adjustment is made; in response to calculated correction angle being greater than 0.5°, make real time feedback and adjustment.

6. The method according to claim 1, wherein a radius of the light spot is larger than 5 mm and one laser head is used to produce the light spot, the print extrusion head is aligned with a center of the light spot.

7. The method according to claim 1, wherein a thickness of each of the multiple layers is 0.2 mm.

* * * * *